United States Patent [19]

Lake

[11] Patent Number: 5,458,007

[45] Date of Patent: Oct. 17, 1995

[54] BI-DIRECTIONAL FLOW INDICATOR

[75] Inventor: Edward G. Lake, Racine, Wis.

[73] Assignee: Lake Monitors, Inc., Racine, Wis.

[21] Appl. No.: 278,963

[22] Filed: Jul. 22, 1994

[51] Int. Cl.$^6$ .................................. G01F 1/22; G01F 1/40
[52] U.S. Cl. ...................... 73/861.58; 73/861.53
[58] Field of Search ........................... 73/861.53, 861.56, 73/861.57, 861.58

[56] References Cited

U.S. PATENT DOCUMENTS

| | | | |
|---|---|---|---|
| 859,088 | 4/1907 | Lindmark . | |
| 2,061,852 | 11/1936 | Schweitzer | 73/861.58 X |
| 2,293,987 | 8/1942 | Krueger | 73/210 |
| 2,574,866 | 11/1951 | Fahrlander | 73/210 |
| 2,816,441 | 12/1957 | Ezekiel | 73/207 |
| 3,011,343 | 12/1961 | White et al. | 73/861.58 |
| 3,528,288 | 9/1970 | Scourtes | 73/207 |
| 3,805,611 | 4/1974 | Hedland | 73/209 |
| 4,112,757 | 9/1978 | Hayward | 73/861.53 |
| 4,254,664 | 3/1981 | Graham | 73/861.58 |
| 4,366,718 | 1/1983 | Nelson | 73/861.58 |
| 4,986,133 | 1/1991 | Lake | 73/861.58 |
| 5,038,621 | 8/1991 | Stupecky | 73/861.53 |

*Primary Examiner*—Hezron E. Williams
*Assistant Examiner*—William L. Oen
*Attorney, Agent, or Firm*—Godfrey & Kahn

[57] ABSTRACT

Disclosed is a flow indicator including a tubular body containing a rod and a magnetized orifice member moving along the rod. The rod has a central ridge of greatest cross-sectional area, tapers toward either end and has a rate of taper which increases toward the end. In the repose position, an orifice is in registry with the ridge. The flow indicator detects relatively small flow rates and yet accommodates substantially greater flow rates without "topping out." One embodiment includes a magnetic follower on the outside of the body for coacting with the moving orifice member to indicate bi-directional flow.

13 Claims, 3 Drawing Sheets

U.S. Patent    Oct. 17, 1995    Sheet 3 of 3    5,458,007
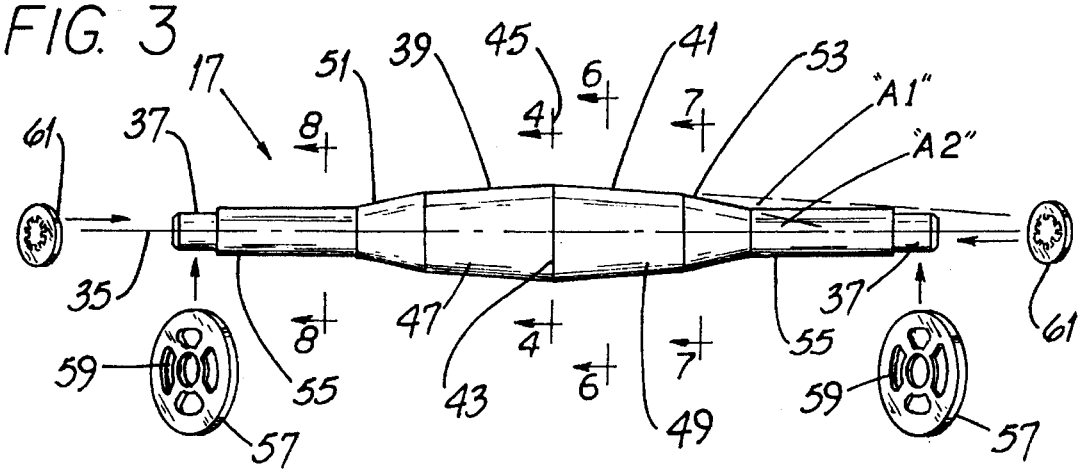
FIG. 4
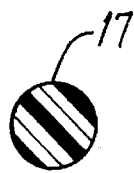
FIG. 6
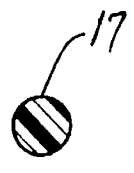
FIG. 7
FIG. 8
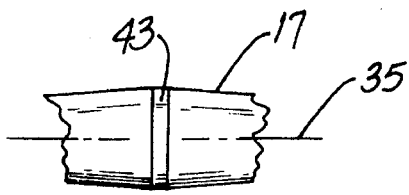
FIG. 5

BI-DIRECTIONAL FLOW INDICATOR

FIELD OF THE INVENTION

This invention is related generally to measuring and testing and, more particularly, to fluid flow indicators used therefor.

BACKGROUND OF THE INVENTION

Fluid flow indicators and meters are widely used for detecting fluid flow in a line and for indicating the rate at which such fluid is flowing. Such indicators and meters are typically installed in series with the flow line and provide a visual or electrical indication of flow per se and/or of the rate of flow in volumetric units per unit of time, e.g., gallons per minute.

Various structures are used to indicate rate of flow and one such "unidirectional" structure is the subject of U.S. Pat. No. 3,805,611 (Hedland). The Hedland flow meter includes a hollow, spring biased, elongated piston with an opening of reduced diameter at one end. A concentric rod extends through the opening and has a tapered portion and a portion of uniform diameter.

The piston coacts with the tapered portion of the rod in a manner such that the area of the annular space between them varies with the relative position of the piston with respect to the rod. That is, as the rate of fluid flow increases, the piston moves in a direction to compress a spring and to cause an increase in the annular area.

Another unidirectional flow meter is the subject of U.S. Pat. No. 4,986,133 (Lake). Among other differences, the Lake flow meter uses a thin disc in place of an elongated piston to coact with a rod having a uniform taper.

Similar unidirectional flow meters use the same fundamental structure of a tapered rod and piston and further incorporate switches and the like for providing electrical signals at particular flow rates. Examples of flow meters of these general types are shown in U.S. Pat. Nos. 3,805,611; 4,349,711; 4,389,901 and 4,487,077.

Exemplary bi-directional flow indicators and transducers are shown in U.S. Pat. Nos. 2,574,866 (Fahrlander); 3,528,288 (Scourtes) and 4,366,718 (Nelson). The Scourtes transducer system uses an armature member which slides along and is guided by a shaft of uniform diameter. Such armature member has a circular knife edge which coacts with the profiled interior surface of the body portion. The diameter of the central part of such surface increases at a uniform rate but such diameter does not change near the outer ends of such interior surface. Each of a pair of springs bears against the armature member for all positions of such member.

The Fahrlander gauge is similar in configuration and operation to the Scourtes system. A difference is that the body opening of the Fahrlander gauge has a generally cylindrical central portion with portions of increasing diameter on either side. Another difference involves the rod-guided compression spring on either side of the rod-guided "travelling" plug of the Fahrlander gauge. The length to which each such spring can extend is limited by flanged bushings which are "stopped" against a shoulder on the support rod. As a result, a single spring bears against the travelling plug whenever such plug moves away from its centered location.

The Nelson transducer has a tube-like core with a central annular ridge. Such ridge moves with respect to a similar ridge on a stationary rod. The Nelson transducer is similar to the Fahrland gauge in that the Nelson transducer also has a compression spring on either side of the moving core. The length to which each such spring can extend is limited by a spring guide bearing against a washer-like spacer mounted on the rod. And like the Fahrlander gauge, a single spring bears against the travelling core whenever such core moves away from its centered location.

While these prior art bi-directional devices have been generally satisfactory for their intended purposes, they are not without disadvantages. For example, the Fahrlander gauge and the Nelson and Scourtes transducers involve a relatively large number of parts. And both the Nelson and Scourtes transducers require electrical "readout" circuits. Such parts and circuits must be made, inventoried, assembled and, perhaps, later serviced. The cost implications are apparent.

Yet another disadvantage is more subtle and involves the way the devices operate at low and high flow rates. The moving component of the Fahrlander, Scourtes and Nelson devices coacts with a curved central profile (the central interior surface of the Fahrlander and Scourtes bodies or the ridge-like exterior surface of the Nelson rod), the cross-sectional area of which changes rather rapidly per unit length. Therefore, for low flow rates and small changes in such flow rates, the incremental change in position of the moving component is slight and more difficult to detect.

On the other hand, the cross-sectional area of the profiles toward the outer ends of such interior surfaces or rod does not change at all. Such profiles are substantially cylindrical. As a result, the moving component may "top out" a high flow rates. It appears the moving component may actually impact an end of the device under high flow.

Another disadvantage of the Fahrlander and Nelson devices is that parts having curved surfaces are usually more difficult to make than parts having surfaces tapered at a uniform rate. This, too, has implications for manufacturing cost.

A bi-directional flow indicator which resolves some of the disadvantages of prior art bi-directional indicators would be an important advance in the art.

OBJECTS OF THE INVENTION

It is an object of this invention to provide a bi-directional flow indicator overcoming some of the problems and shortcomings of the prior art.

Another object of this invention is to provide a bi-directional flow indicator which clearly shows low-rate flow and small changes in such flow.

Another object of this invention is to provide a bi-directional flow indicator which substantially avoids "topping out" at high flow rates.

Yet another object of this invention is to provide a bi-directional flow indicator which has relatively few parts.

Another object of this invention is to provide a bi-directional flow indicator which has a minimal number of parts and is easy to manufacture.

Still another object of this invention is to provide a bi-directional flow indicator which in one embodiment is free of electrical "readout" circuits. How these and other objects are accomplished will become apparent from the following descriptions and from the drawing.

SUMMARY OF THE INVENTION

The invention involves a flow indicator which has a tubular body containing a rod and a magnetized orifice member which moves along the body. In the improvement, the rod has a central ridge of greatest cross-sectional area and has lesser cross-sectional areas at positions along the rod and progressively farther from the central ridge on either side of such ridge. The orifice member is in registry with the central ridge when the indicator is in the quiescent position with no fluid flow through it. And such orifice member is displaceable in either direction from the central ridge, the direction depending on the direction of fluid flow.

In a more specific embodiment, the indicator includes a magnetic follower on the outside of the body for coacting with the orifice member. Such follower is movable in either direction away from the central ridge and "tracks" the movement of the orifice member (i.e., has position-correspondence with such orifice member) to indicate bi-directional flow. The follower is desirable when the body is made of opaque material, when the indicator is used with opaque liquids, when it is desired to "interface" devices e.g., an alarm or electric readout, with the indicator or when the user simply wishes the convenience of a easy-to-read follower.

In another aspect of the invention, the orifice member includes an orifice disc interposed between magnet rings. Such rings are retained in contact with the disc by magnetic force, most preferably only by magnetic force. That is, the orifice member is free of rivets, bolts, adhesive or other types of "mechanical" fastening means.

Each of the magnet rings is annular and has generally cylindrical interior and exterior surfaces. The disc includes a circular sharp-edged orifice, the diameter of which is less than the diameter of the interior surfaces. Further, the orifice member has an exterior surface of substantially uniform diameter. The tubular body has a generally cylindrical interior surface and the diameter of the orifice member is selected to provide slight sliding clearance between the tubular body and the orifice member. In that way, the orifice member is guided by the body.

In yet another aspect of the invention, the orifice member has first and second annular ends. The indicator includes first and second centering springs which have the same diameter and are otherwise substantially identical. Each spring has a proximal end toward the center of the indicator and when the orifice member is in registry with the central ridge, the proximal end of the first spring bears against the first end and the proximal end of the second spring bears against the second end.

In a highly preferred arrangement, the proximal end of the first spring is separated and spaced from the first end of the orifice member when such member is displaced from the central ridge. However, the proximal end of the second spring continues to bear against the second end of the orifice member.

And the new indicator is configured in a way that supports and guides the springs, notwithstanding that the proximal end of a spring is spaced from the orifice member. Specifically, the body has a generally cylindrical interior surface and the diameter of the springs is slightly less than the diameter of the interior surface. Thus, sliding clearance is provided between the springs and such surface. In that way, the springs are maintained aligned with the respective ends of the orifice member when such member is displaced from the central ridge and a proximal end of a spring is spaced from an end of such member.

In yet another aspect of the invention, the rod defines a longitudinal axis and has a central portion at a first angle with respect to the longitudinal axis. Such rod has a distal portion at a second angle with respect to the longitudinal axis and the second angle is greater than the first angle. So configured, the indicator is sensitive to very low flow rates and small changes in such rates but tolerates a high flow rate without "topping out" to the extent that a spring is compressed to solid height by the orifice member slamming against it.

The rod also has a pair of stud ends for supporting the rod in the body and there is a generally cylindrical rod portion between each distal portion and each stud end. In other words, the rod is generally symmetrical about a plane normal to the longitudinal axis and coincident with the central ridge. Fastened to each stud end is an apertured plate for concentrically supporting the rod in the body. Each such plate has a diameter about equal to that of the body interior surface and also has apertures therethrough to permit free flow of fluid through the indicator.

From the foregoing, it will be appreciated that the rod is stationary and the orifice member moves with respect to such rod. Considering the indicator in another way, the rod surface has a central portion tapered at a first, somewhat gradual, rate and a distal portion tapered at a second, more rapid rate. That is, the second rate is greater than the first rate to provide low-flow-rate sensitivity and resistance to topping out in the presence of high flow rates.

The rod has first and second central portions, the surfaces of which extend to the ridge. In a highly preferred embodiment, the ridge is embodied as a knife-like edge and in a less preferred embodiment, the ridge is generally cylindral over a short distance measured parallel to the rod axis.

Further details regarding the inventive indicator are set forth in the detailed description and in the drawing.

BRIEF DESCRIPTION OF THE DRAWING

FIG. 3 is a side elevation view of the rod and rod support components of the flow indicator of FIG. 2.

FIG. 4 is a cross-section view of the rod of FIG. 3 taken along the viewing plane 4—4 thereof.

FIG. 5 is a side elevation view of another embodiment of the rod shown in FIG. 3. Parts are broken away.

FIG. 6 is a cross-section view of the rod of FIG. 3 taken along the viewing plane 6—6 thereof.

FIG. 7 is a cross-section view of the rod of FIG. 3 taken along the viewing plane 7—7 thereof.

FIG. 8 is a cross-section view of the rod of FIG. 3 taken along the viewing plane 8—8 thereof.

DETAILED DESCRIPTIONS OF PREFERRED EMBODIMENTS

Figure 1:
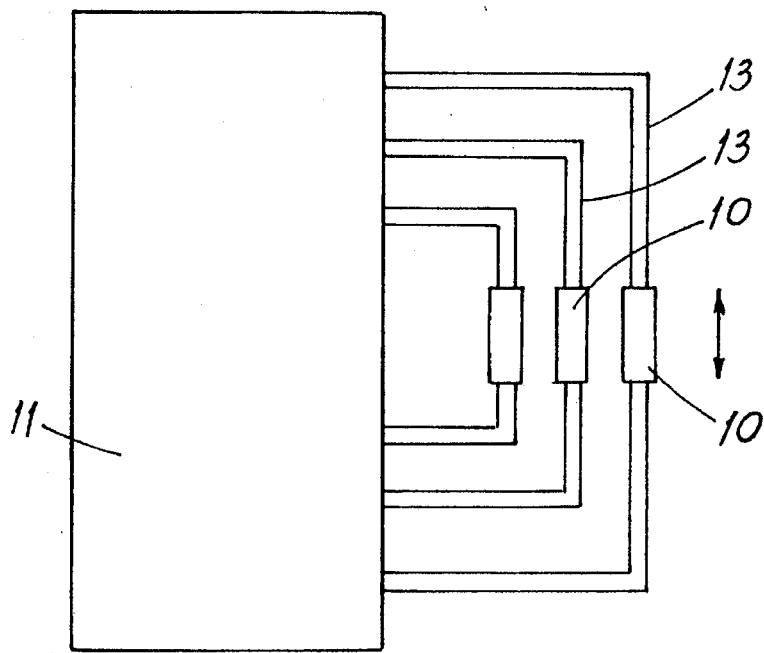
FIG. 1 is a representative drawing of a machine equipped with the inventive flow indicators. No particular type of machine is intended.

Before describing the new flow indicator 10, it will be helpful to have an understanding of a way in which such indicator 10 is used. FIG. 1 shows a representative machine 11 which has several hydraulic lines 13 with hydraulic fluid flowing through each line 13. An indicator 10 is mounted in series with each line 13 and informs the user whether and in which direction fluid is flowing in such line 13. Other ways to use the new indicator 10 are explained near the end of this specification.

Figure 2:
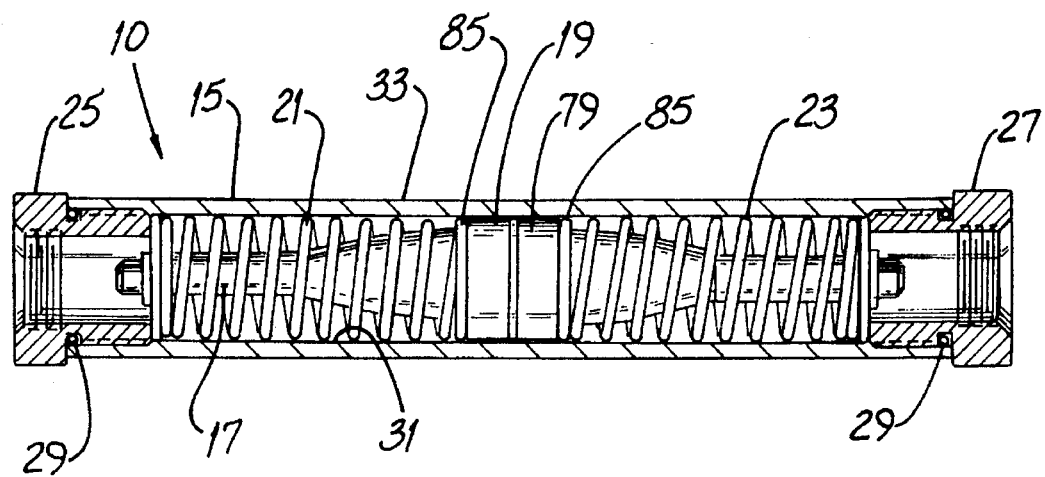
FIG. 2 is a cross-sectional view of one embodiment of the flow indicator in the quiescent position with no fluid flowing therethrough.

Referring next to FIG. 2, a first embodiment of the flow indicator 10 has as its primary components a tubular body 15, a rod 17, an orifice member 19, first and second coiled compression-type centering springs 21, 23, respectively, and a pair of port fittings 25, 27. A port fitting 25, 27 is threaded to each end of the body 15 and an O-ring seal 29 is between each fitting 25, 27 and the body 15 to prevent fluid from leaking from such body 15.

The body 15 has generally cylindrical interior and exterior surfaces 31 and 33, respectively, and may be formed of glass, of a plastic material or of any other material which is reasonably transparent. The material and its wall thickness are selected in view of the pressures prevailing in the fluid flowing in the indicator 10.

Referring also to FIG. 3, the rod 17 has a longitudinal axis 35, a pair of stud ends 37, first and second central portions 39 and 41, respectively, and a ridge 43 between such portions 39, 41. Such rod 17 is generally symmetrical about a plane 45 normal to the longitudinal axis 35 and coincident with the ridge 43.

The surfaces 47, 49 of the central portions 39, 41, respectively, extend to the ridge 43 and viewed in cross-section as in FIG. 4, the ridge 43 has the greatest cross-sectional area of any part of the rod 17. In the highly preferred embodiment of FIG. 3, the ridge 43 is embodied as a knife-like edge and in another embodiment shown in FIG. 5, the ridge 43 is generally cylindrical over a short distance measured parallel to the rod axis 35.

Each of the central portions 39, 41 is at a first angle "A1" with respect to the axis 35 and the rod 17 also has first and second distal portions 51, 53, respectively, each at a second, greater angle "A2" with respect to such axis 35. There is a generally cylindrical portion 55 between each distal portion 51, 53 and each stud end 37. Cross-sectional views of a central portion 41, a distal portion 53 and a cylindrical portion 55 are shown in FIGS. 6, 7 and 8, respectively.

From FIG. 3, it is apparent that each central portion 39, 41 is tapered at a first, somewhat gradual, rate and that each distal portion 51, 53 is tapered at a second, more rapid rate. In one specific embodiment, the diameter of a central portion 39, 41 diminishes at the rate of about 0.066 inches per inch of length and the diameter of a distal portion 51, 53 diminishes at the rate of about 0.54 inches per inch of length. As will become apparent, the rod 17 is primarily the component which causes the indicator 10 to be sensitive to very low flow rates and small changes in such rates but to tolerate a high flow rate without "topping out."

Mounted on each stud end 37 is an apertured plate 57 which concentrically supports the rod 17 in the body 15. Each such plate 57 has a diameter about equal to that of the body interior surface 31 and also has several apertures 59 therethrough to permit free flow of fluid through the indicator 10. Each plate 57 is attached to its end 37 by a press-on fastener 61.

Figure 9:
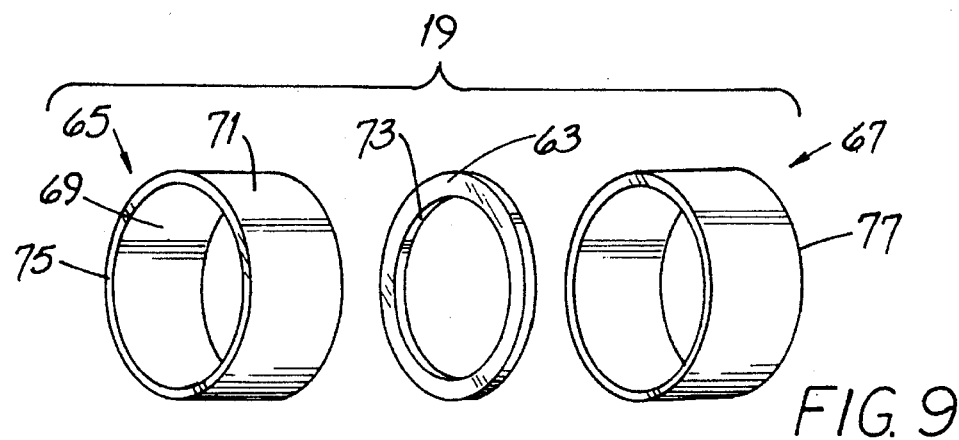
FIG. 9 is an exploded perspective view of the orifice member component of the new indicator.

Referring again to FIG. 2 and also to FIG. 9, the orifice member 19 will now be described. Such member 19 includes an orifice disc 63 made of magnetic material and interposed between magnetized annular rings 65, 67. Such rings 65, 67 are retained in contact with the disc 63 by magnetic force, most preferably only by magnetic force. That is, the orifice member 19 is free of rivets, bolts, adhesive or other types of "mechanical" fastening means.

Each of the magnet rings 65, 67 is annular and has generally cylindrical interior and exterior surfaces 69 and 71, respectively. The disc 63 includes a circular sharp-edged orifice 73, the diameter of which is less than the diameter of the interior surfaces 69. A sharp-edged orifice 73 is one that has a diameter several times its thickness ("length"), preferably at least 8–10 times. Expressed another way, the thickness of the disc 63 is one-fourth or less of the square root of the cross-sectional area of the orifice 73. Such relationship better retains the laminar flow characteristics of the fluid flowing through the indicator 10.

The orifice member 19 has first and second annular ends 75 and 77, respectively, and as best seen in FIG. 2, has an exterior surface 79 of substantially uniform diameter. The diameters of the body interior surface 31 and the orifice member 19 are cooperatively selected to provide slight sliding clearance between the body 15 and the orifice member 19. In that way, the orifice member 19 is guided by the body 15 over the entire exterior surface 79 of such member 19.

Referring again to FIG. 2, the centering springs 21, 23 have the same diameter and are otherwise substantially identical. Each spring 21, 23 has a proximal end 85 toward the center of the indicator 10 and when no fluid is flowing, the orifice member 19 (and, specifically, the sharp-edge orifice 73) is in registry with the central ridge 43 as in the depictions of FIGS. 2 and 10. When the member 19 is in such quiescent position (as well as in certain other positions), the proximal end 85 of the first spring 21 bears against the first end 75 of the orifice member 19 and the proximal end 85 of the second spring 23 bears against the second end 77 of such member 19.

Figure 11:
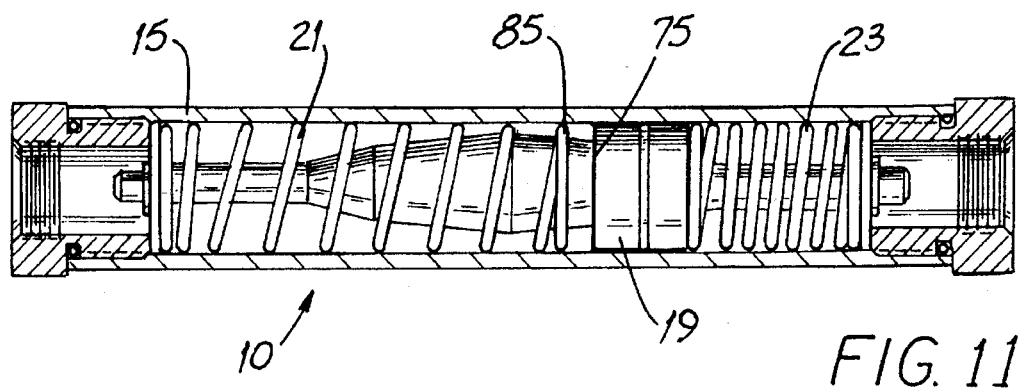
FIG. 11 is a cross-sectional view of the flow indicator of FIG. 2 with the orifice member offset to the right as when fluid flows through the indicator from left to right.

Preferably, the diameter of the springs 21, 23 is very slightly less than the diameter of the body tube interior surface 31. Thus, sliding clearance is provided between the springs 21, 23 and such surface 31. As mentioned in the description of operation, fluid flow will displace the orifice member 19 from the ridge 43, perhaps well away from the ridge 43 if the flow rate is high. As shown in FIG. 11, the springs 21, 23 are nevertheless maintained axially aligned with the respective ends 75, 77 of the orifice member 19 when such member 19 is displaced from the central ridge 43 and a proximal end 85 of a spring 21 is spaced from an end 75 of such member 19.

In applications involving higher pressures, the body 15 is likely to be of metal and not transparent. And even if low pressure fluids are involved, some fluids may be sufficiently opaque to prevent viewing the position of the orifice disc 63 when using the embodiment of the indicator 10 shown in FIG. 2.

Figure 12:
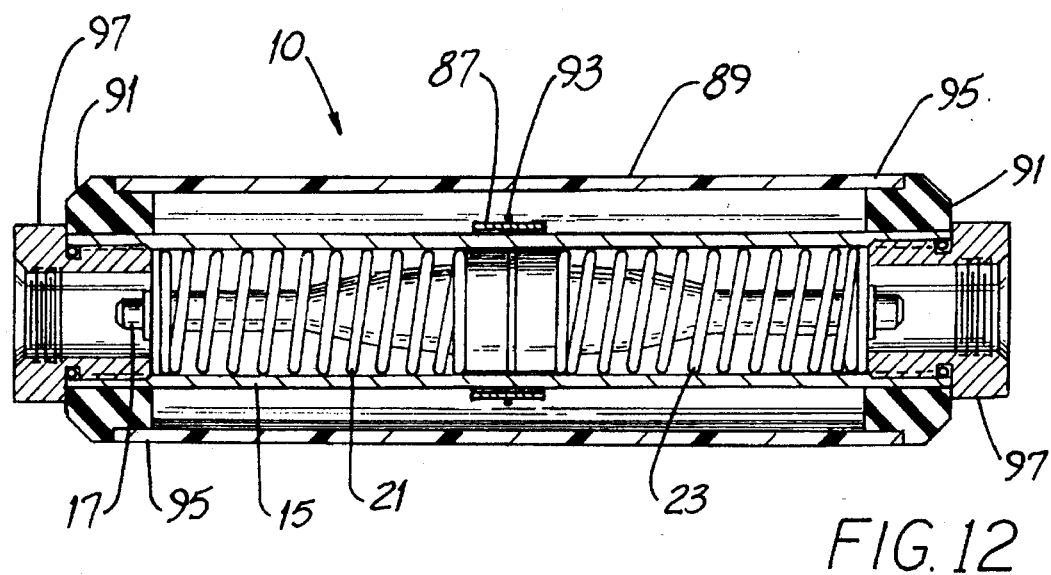
FIG. 12 is a cross-sectional view of another embodiment of the flow indicator having a magnetic follower.

Referring also to FIG. 12, a second embodiment of the flow indicator 10 is configured to provide easy visual indication of the rate or existence of flow, even if the body 15 and/or fluid is opaque. In the second embodiment, the flow indicator 10 has a ring-like magnetic follower 87, a follower shield 89 and a plurality of resilient glands 91. Each is discussed in turn.

The follower 87 moves along the outside of the body 15 and in either direction away from the central ridge 43. The follower 87 "tracks" the movement of the orifice member 19 (i.e., has position-correspondence with such orifice member 19) to indicate bi-directional flow.

The follower 87 is generally cylindrical and has an inside diameter only slightly greater than the outside diameter of the tubular body 15. This permits the follower 87 to move freely along the body 15 without appreciable friction. At its middle, the follower has a marker 93, a raised portion or a circumferential line of contrasting color, which defines the "pointer" for indicating flow.

The follower 87 is formed at least in part of a magnetic material i.e., of a material which is attracted by a magnet but which is not necessarily permanently magnetized. In a preferred embodiment, the entire follower 87 is formed of such magnetic material and in any event, the degree of magnetic coupling between the orifice member 19 and the follower 87 is such that the follower 87 exhibits flow-indicating movement which is substantially coincident with movement of the member 19. Of course, the highest degree of magnetic coupling will result if both the member 19 and the follower 87 are magnetized and are oppositely polarized.

The transparent shield 89 is supported at its ends 95 in a concentric, spaced relationship to the body 15. Support is by a pair of resilient glands 91, one gland 91 being positioned to support each end 95 of the shield 89. Each gland 91 is retained in fluid-sealing engagement with the shield 89, retention being by the flange 97 of a port fitting 25, 27. When the port fittings 25, 27 are installed, each gland 91 will be compressed against the shield 89 and against a flange 97 and in fluid-sealing engagement with both. The flow indicator 10 is thereby made impervious to penetration by washdown sprays or airborne contaminants such as might be encountered in dairies, steel mills, food or chemical processing plants or the like.

Before describing the operation of the indicator 10, it should be understood that whenever a fluid flows through an opening of reduced area, a "differential pressure" is created. That is, the pressure on the upstream side of the opening is greater than the pressure on the downstream side. Consider the example of a garden hose with water flowing through it. And as the flow rate (in, e.g., gallons per minute) increases and assuming the area of the opening remains the same, the differential pressure will rise. On the other hand, if the area of the opening is allowed to increase, the differential pressure rise less rapidly.

Figure 10:
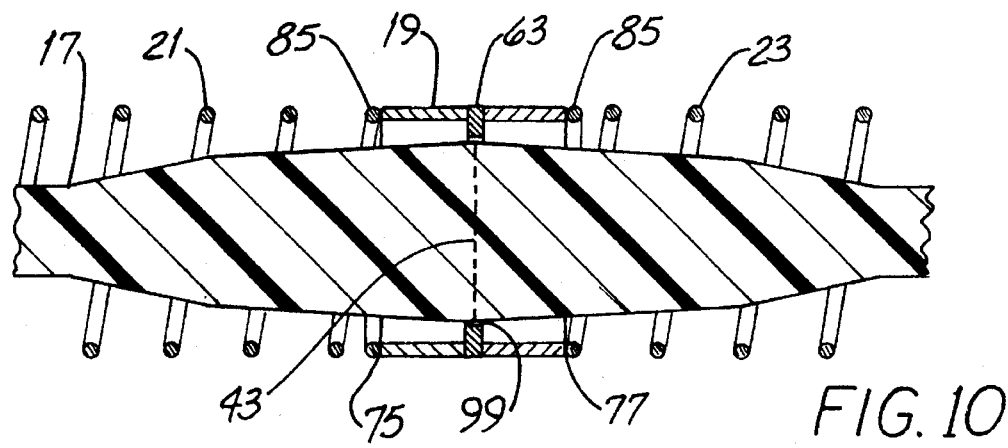
FIG. 10 is an enlarged cross-sectional side elevation view of a portion of the flow indicator of FIG. 3. Parts are broken away and the rod ridge is represented in dashed line.

Referring again to FIG. 2 and also to FIG. 10, the operation of the new indicator 10 will now be described. It is first assumed that there is no flow through the indicator 10 and therefore, the disc 63 is in registry with the ridge 43. It is to be noted that when the disc 63 is so positioned, the area of the annulus 99 defined by the orifice 73 and the ridge 43, i.e., the area through which any fluid will try to flow, is extremely small. For a gas or for a liquid with an assumed constant viscosity, even very low flow into the right-end fitting 27 of the indicator 10 will cause a differential pressure. Such pressure urges the orifice member 19 to the left as generally shown in FIGS. 2 and 10 and because the area of the annulus 99 is very small, even low flow will result in a significant differential pressure.

Because of the very gradual taper of the central portion 39, such pressure will move the orifice member 19 an appreciable distance before there is a significant increase in the area of the annulus 99. And in so moving, the spring 21 is compressed. The orifice member 19 will continue to move until the net spring force acting on the orifice member 19 (spring 23 is relaxing in the described circumstances) and the opposite force resulting from the differential pressure become substantially equal. Then, the orifice member 19 will stabilize at a new position along the rod 17 until flow again changes.

To put it another way, for a given flow rate (within the range capability of the indicator 10) the area of the annulus 99 between the orifice disc 63 and the rod 17 will increase to a value such that the differential pressure across the orifice disc 63 will be precisely counterbalanced by the net spring force (the rightward force from spring 21 algebraically summed with the leftward force from the spring 23). The orifice disc 63 will therefore be in force equilibrium, no further movement of the disc 63 will occur and the flow rate may be determined by observing the position of the orifice disc 63 or the marker 93 with respect to a scale on the body 15 or on the shield 89, respectively.

It should also be appreciated that as the disc 63 comes into registry with a distal portion 51, 53 of the rod 17, the area of the annulus 99 is greater and increases at a greater rate per unit of travel distance of the member 19 toward an end of the indicator 10. This is so since the distal portions 51, 53 have a much "steeper" taper than the central portions 39, 41. And the lengths of the springs 21, 23 are preferably selected so that if the orifice member 19 moves sufficiently far "off center," the proximal end 85 of one spring 21, 23 separates from the corresponding end 75 or 77, respectively, of the orifice member 19.

The indicator 10 need not be used as only a visual indicator of flow. Electrical components can be added, for example, to "interface" with the orifice member 19 or the follower 87, as the case may be, and sound an alarm, provide a remote reader indication, trip a switch or the like.

It is to be appreciated that the indicator 10 can be used in a number of ways. For example, flow in either direction through a line 13 may be at some elevated level during machine operation but should be at zero flow when the machine 11 is shut down. The indicator 10 detects relatively small flow rates other than zero and thereby alerts personnel to a leakage problem.

Other ways to use the indicator 10 include measuring the magnitude of flow in either direction or measuring such magnitude in only one direction but permitting flow to occur in the other. And the indicator 10 is useful merely to indicate that flow is occurring in a particular direction without regard to the magnitude of such flow.

While the principles of this invention have been described in connection with specific embodiments, it should be understood clearly that these descriptions are made only by way of example and are not intended to limit the scope of the invention.

I claim:

1. In a flow indicator including a tubular body containing a rod and a magnetized orifice member movable therealong, the improvement wherein:

the rod has a central ridge of greatest cross-sectional area; such rod having a lesser cross-sectional areas at positions therealong progressively farther from the central ridge on either side thereof;

the orifice member is in registry with the central ridge and is displaceable therefrom in either direction depending on direction of fluid flow, the orifice member includes an orifice disc interposed between magnet rings;

the indicator includes a magnetic follower on the outside of the body for coacting with the orifice member; and the magnetic follower is movable in either direction away from the central ridge; whereby bi-directional flow is indicated.

2. The flow indicator of claim 1 wherein the magnet rings are retained in contact with the disc by magnetic force.

3. The flow indicator of claim 1 wherein:

each of the magnet rings has a generally cylindrical interior surface;

the disc includes a circular sharp-edged orifice; and the diameter of the orifice is less than the diameter of the interior surfaces.

4. The flow indicator of claim 1 wherein:

the orifice member has first and second annular ends;

the indicator includes first and second centering springs, each of which has a proximal end; and when the orifice member is in registry with the central ridge, the proximal end of the first spring bears against the first annular end and the proximal end of the second spring bears against the second annular end.

5. The flow indicator of claim 4 wherein:

when the orifice member is displaced from the central ridge, the proximal end of the first spring bears against the first annular end and the proximal end of the second spring bears against the second annular end.

6. The flow indicator of claim 1 wherein:

the body has a generally cylindrical interior surface;

the orifice member has first and second annular ends;

the indicator includes first and second centering springs of equal diameter and each spring has a proximal end; and the diameter of the springs is slightly less than the diameter of the interior surface:

whereby when the orifice member is displaced from the central ridge and the proximal end of the first spring is spaced from the first annular end, the first spring is maintained aligned with such first annular end.

7. In a flow indicator including a tubular body containing a rod and a magnetized orifice member movable therealong, the improvement wherein:

the rod has a central ridge of greatest cross-sectional area, such rod having lesser cross-sectional areas at positions therealong progressively farther from the central ridge on either side thereof;

the orifice member is in registry with the central ridge and is displaceable therefrom in either direction depending on direction of fluid flow, the orifice member has an exterior surface of substantially uniform diameter, the tubular body has a generally cylindrical interior surface, and the diameter of the orifice member is selected to provide slight sliding clearance between the tubular body and the orifice member whereby the orifice member is guided by the body, and the orifice member comprises an orifice disc interposed between magnet rings and the magnet rings are retained in contact with the disc by magnetic force;

the indicator includes a magnetic follower on the outside of the body for coacting with the orifice member; and the magnetic follower is movable in either direction away from the central ridge; whereby bi-directional flow is indicated.

8. In a flow indicator including a tubular body containing a rod and a magnetized orifice member movable therealong, the improvement wherein:

the rod has a central ridge of greatest cross-sectional area, such rod having lesser cross-sectional areas at positions therealong progressively farther from the central ridge on either side thereof, the rod defines a longitudinal axis and has a central portion at a first angle with respect to the longitudinal axis, the rod has a distal portion at a second angle with respect to the longitudinal axis, and the second angle is greater than the first angle;

the orifice member is in registry with the central ridge and is displaceable therefrom in either direction depending on direction of fluid flow;

the indicator includes a magnetic follower on the outside of the body for coacting with the orifice member; and the magnetic follower is movable in either direction away from the central ridge; whereby bi-directional flow is indicated.

9. The flow indicator of claim 8 wherein the rod includes:

a stud end for supporting the rod in the body; and a generally cylindrical portion between the distal portion and the stud end.

10. The flow indicator of claim 9 wherein:

the rod includes a pair of stud ends; and an apertured plate is attached to each stud end for concentrically supporting the rod in the body.

11. In a bi-directional flow indicator including a body containing a rod and a magnetized orifice member movable therealong, the improvement wherein:

the rod has a central ridge of greatest cross-sectional area, such rod having lesser cross-sectional areas at positions therealong progressively farther from the central ridge on either side thereof, the rod defines a longitudinal axis and has a central portion at a first angle with respect to the longitudinal axis, the rod has a distal portion at a second angle with respect to the longitudinal axis, and the second angle is greater than the first angle;

the orifice member comprises a disc interposed between magnet rings, the orifice member is in registry with the central ridge and is displaceable therefrom in either direction depending on direction of fluid flow, whereby bi-directional flow is indicated.

12. The flow indicator of claim 11 wherein the body is composed of a transparent material.

13. The flow indicator of claim 11 wherein the indicator includes a magnetic follower on the outside of the body for coacting with the orifice member, and the magnetic follower is movable in either direction away from the central ridge.

* * * * *